(12) United States Patent
Peltz et al.

(10) Patent No.: US 8,352,875 B2
(45) Date of Patent: Jan. 8, 2013

(54) SYSTEM AND METHOD FOR INTEGRATING A PLURALITY OF SOFTWARE APPLICATIONS

(75) Inventors: Christopher Peltz, Windsor, CO (US); Inbal Marhaim, Yehud (IL); Eli Mordechai, Modlin (IL); Claudio Bantolini, Palo Alto, CA (US); Ruth Bergman, Haifa (IL); Oren Ariel, Hod HaSharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/620,520

(22) Filed: Nov. 17, 2009

(65) Prior Publication Data

US 2011/0119603 A1 May 19, 2011

(51) Int. Cl.
*G06F 13/00* (2006.01)
*G06F 15/00* (2006.01)

(52) U.S. Cl. ...................................... 715/762; 715/763
(58) Field of Classification Search .................. 715/746, 715/751, 760–765, 743–745, 851–853, 840–841
See application file for complete search history.

(56) References Cited

U.S. PATENT DOCUMENTS

| | | | |
|---|---|---|---|
| 2005/0076022 A1* | 4/2005 | Wu et al. | 707/3 |
| 2006/0036570 A1* | 2/2006 | Schaefer et al. | 707/1 |
| 2009/0307653 A1* | 12/2009 | Hoff | 717/105 |

* cited by examiner

*Primary Examiner* — Cao "Kevin" Nguyen

(57) ABSTRACT

A method for integrating a plurality of existing software applications is disclosed. The method comprises executing the plurality of existing software applications. A composite graphical user interface (GUI) is created containing selected objects. A user's interactions with each of the plurality of existing software applications are recorded to record at least one function from each of the plurality of existing software applications. The at least one recorded function from each of the plurality of existing software applications is assigned to at least one of the selected objects in the composite GUI.

20 Claims, 5 Drawing Sheets

```xml
<?xml version="1.0" encoding="UTF-8" standalone="no" ?>
- <dictionary>
  - <item>
    - <key>
        <string>six</string>
      </key>
    - <value>
      - <UIElementInfo name="six" independentChildren="True">
        - <sourceData>
            <HtmlElementSourceData sourceElementId="" sourceElementName="six" sourceUrl="http://www.calculate.com" />
          </sourceData>
        - <remoteEventTypes>
            <ArrayOfString />
          </remoteEventTypes>
        </UIElementInfo>
      </value>
    </item>
  - <item>
    - <key>
        <string>five</string>
      </key>
    - <value>
      - <UIElementInfo name="five" independentChildren="True">
        - <sourceData>
            <HtmlElementSourceData sourceElementId="" sourceElementName="five" sourceUrl="http://www.calculate.com" />
          </sourceData>
        - <remoteEventTypes>
          - <ArrayOfString>
              <string>onclick</string>
            </ArrayOfString>
          </remoteEventTypes>
        </UIElementInfo>
      </value>
    </item>
  </dictionary>
```

FIG. 3

```
<?xml version="1.0" encoding="UTF-8" standalone="no"?> <string>
<script type="text/javascript">
    function six_onclick(){enterVal('6')}
    function seven_onclick(){enterVal('7')}
    function div_onclick(){operator('/')}
    function percent_onclick(){pcnt()}
    function mem_p_onclick(){memory_p()}
    function sq_root_onclick(){sqRT()}
    function mem_c_onclick(){memory_c()}
    function two_onclick(){enterVal('2')}
    function clear_entry_onclick(){clearEntry()}
    function zero_onclick(){enterVal('0')}

[Additional function declarations here as needed.]

function eight_onclick(){enterVal('8')} </script>

<BODY><P> <P>
<TABLE id=mainTable height=100 width=200 border=0> <TBODY>
    <TR id=row0>
    <TD id=cell0_0>
        <INPUT id=screen style="FONT-SIZE: 14pt; VISIBILITY: visible; COLOR:rgb(0,255,0); FONT-FAMILY: Digiface; BACKGROUND-COLOR:rgb(0,0,0)"
        <TABLE id=element36 style="VISIBILITY: visible" border=1 name="element36"> <TBODY id=element35 style="VISIBILITY: visible" name="element35">
            <TR id=element4 style="VISIBILITY: visible" align=middle name="element4">
            <TD id=element0 style="VISIBILITY: visible" name="element0">
                <INPUT id=mem_p style="VISIBILITY: visible" onclick=mem_p_onclick() type=button value=" M+ " name=mem_p><TD>
            <TD id=element1 style="VISIBILITY: visible" name="element1">
                <INPUT id=mem_s style="VISIBILITY: visible" onclick=mem_s_onclick() type=button value=" M- " name=mem_s><TD>
            <TD id=element2 style="VISIBILITY: visible" name="element2">
                <INPUT id=mem_r style="VISIBILITY: visible" onclick=mem_r_onclick() type=button value=" MR " name=mem_r><TD>
            <TD id=element3 style="VISIBILITY: visible" name="element3">
                <INPUT id=mem_c style="VISIBILITY: visible" onclick=mem_c_onclick() type=button value=" MC " name=mem_c><TD></TR>
            <TR id=element9 style="VISIBILITY: visible" align=middle name="element9"> <TD id=element5 style="VISIBILITY: visible" name="element5">
                <INPUT id=sq_root style="VISIBILITY: visible" onclick=sq_root_onclick() type=button value=" sqrt " name=sq_root><TD>
            <TD id=element6 style="VISIBILITY: visible" name="element6"><
                INPUT id=square style="VISIBILITY: visible" onclick=square_onclick() type=button value=" sqr " name=square><TD>
            <TD id=element7 style="VISIBILITY: visible" name="element7">
                <INPUT id=percent style="VISIBILITY: visible" onclick=percent_onclick() type=button value=" % " name=percent><TD>
            <TD id=element8 style="VISIBILITY: visible" name="element8">
                <INPUT id=negate style="VISIBILITY: visible" onclick=negate_onclick() type=button value=" +/- " name=negate><TD></TR>
            <TR id=element14 style="VISIBILITY: visible" align=middle name="element14">
            <TD id=element10 style="VISIBILITY: visible" name="element10">
                <INPUT id=seven style="VISIBILITY: visible" onclick=seven_onclick() type=button value=" 7 " name=seven><TD>
            <TD id=element11 style="VISIBILITY: visible" name="element11">
```

FIG. 4

SYSTEM AND METHOD FOR INTEGRATING A PLURALITY OF SOFTWARE APPLICATIONS

BACKGROUND

Integrating different software applications can be difficult. Even when such applications are designed to fit together, creating an integrated solution often involves a significant effort in terms of configuration, fine tuning, and resolving deployment conflicts. If the original applications were designed in isolation and not originally intended to provide an integrated solution, the integration can use hundreds of hours of time from experienced programmers.

Despite the difficulty, integration of disparate software applications is often needed. The need can arise due to the adoption of updated computers or operating systems, the transition of business processes to the internet, or through mergers and acquisitions of companies using proprietary software.

For example, Company A may merge with Company B. Each company may have its own proprietary software for purchasing materials. When the two companies merge, purchasing agents may have to run two different purchasing programs, entering duplicate data on each screen. The cost of merging the two programs, and the length of time needed to do so, can often cause delays before an application integration can take place. This can create substantial inefficiencies in the operation of the merged companies.

Integration has typically been accomplished using middleware technologies. Middleware solutions use an application integrator to go deep into the original applications' source code and to write wrappers that integrate the original application into the new technology. In order to do this, the application integrator typically has to become intimately familiar with the source code. This can be extremely difficult for software code that has not been properly documented or for software written in archaic languages.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 illustrates an example of XML code that is generated for components in an integrated graphical user interface;

FIG. 4 illustrates an example of HTML code that can be generated for components in a graphical user interface.

DETAILED DESCRIPTION

Figure 1:
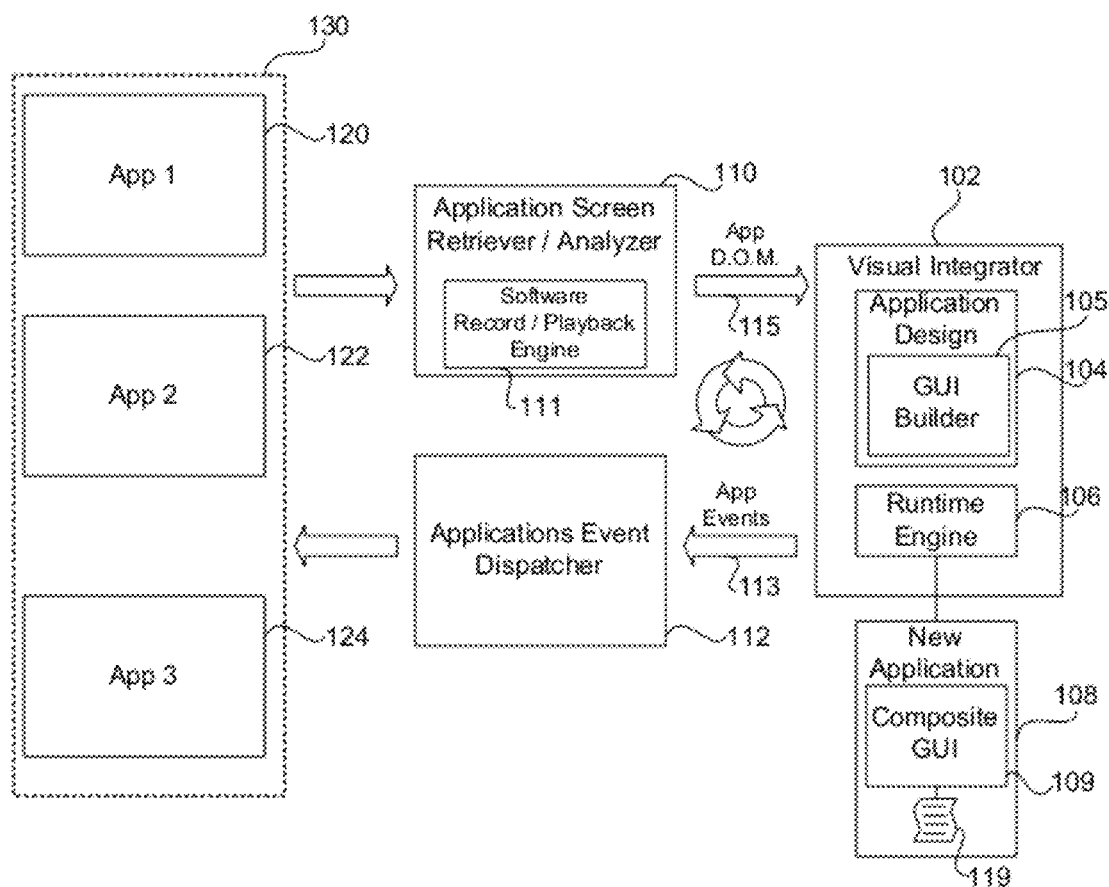
FIG. 1 is an illustration of an embodiment of a block diagram of an architecture for a visual product integrator.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification are labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

To reduce the complexities that exist in integrating multiple software applications, a visual product integrator (VPI) has been developed that enables disparate software programs to be quickly integrated. The VPI allows an application designer to integrate multiple existing software applications by recording a user's interaction with the existing software applications in order to capture desired functions of the existing software. The application designer can create a composite graphical user interface (GUI) containing components to produce the desired functions contained in the multiple existing software applications. A composite GUI is a user interface that includes functionality from at least two separate applications. The recorded functions from the existing software applications can be applied to the components in the composite GUI to provide the functionality. These functions can operate in the composite GUI by enabling the components in the composite GUI to interact with the existing software applications as needed. As a result, there is typically no need for the application designer to access data level API's of the existing software applications to create the composite GUI.

The ability to create the new user interface enables an application designer to quickly integrate multiple software applications into the single, new composite graphical user interface. The existing software applications can be run in the background, enabling a user to see only the composite GUI. The composite GUI can be changed and updated with relative ease, allowing the application designer to design the GUI in an optimal fashion based on the users' needs and desires. This enables disparate software applications to be easily integrated and redesigned by individuals and companies as needed without the great expense or large amount of development time that has been typical in the past for software application integration.

In accordance with one embodiment, FIG. 1 provides an illustration of a block diagram of an architecture for the visual product integrator (visual integrator) 102. The visual integrator includes an application design module 104. The design module provides a graphical user interface (GUI) builder 105. In one embodiment, the GUI builder is configured to behave as a what-you-see-is-what-you-get (WYSIWYG) GUI builder.

An application designer can use the GUI builder 105 to design the composite GUI 109 by placing desired user interface (UI) components into an application interface that will allow the composite GUI to be used to produce the desired functions contained in the multiple existing software applications. The components in the composite GUI can be composed of two classes of components. The first class is comprised of new components inserted using the GUI builder 105.

The second class is comprised of components copied from the multiple existing software applications. In one embodiment, the components that are copied can include HTML, XHTML, XML structures, and other web application structures. When a user copies a structure, the necessary software code to duplicate the component in the composite GUI can be automatically copied from the existing application's object application programming interface (API). However, there is no need for the user to actually interact with the software code.

Components from either the first or second class that are inserted into the composite GUI can be assigned one or more selected actions. Each component can be assigned actions or functions. New components and copied components can be assigned actions by associating a component with a recorded script that contains: all or part of a recorded script, some hand-coded instructions, or a combination of both hand-coded and recorded script elements. The recorded script can be called from the corresponding event of the new component that is desired to activate the script. This linkage can be created in a graphical mapping tool that links the scripts to the new graphical control or copied graphical control. Alternatively, the code to call the recorded scripts can be directly coded in the appropriate event handler for the new component or copied component. These copied components can be stored in the copied mark-up language or web application language format The new functions can be executed locally in the new application 108 using JavaScript, advanced HTML structures in a browser, or another web application development language.

The components copied from one of the multiple existing applications 120, 122, 124 can be selected to maintain their original behavior, in which case the components will execute their original action in the original application. Maintaining a GUI control's original behavior means that the event handling functions of the new control will use scripts to access the original functions of the original component by calling script functions that activate the existing component in the same way it would have originally be activated.

Both new and copied components in the composite GUI can be assigned a "workflow action" comprising a script that is recorded by a recording engine 111 when using one or more UI components from one or more of the multiple existing applications 120, 122, 124. The recorded script is formed as the application designer uses the UI components of the existing applications. As the application designer interacts with UI components of the existing applications in a typical fashion, the designer's interaction is recorded as the script. The script includes the actions (events and functions) that occur in the existing applications in response to the designer's interactions. The assigned actions will be discussed more fully below.

FIG. 3 illustrates an example of XML code additions that may be generated for a component in a graphical user interface of an application in order to store additional component data which is used by the integrated application. The XML additions enable the integrated application creator to extend the functionality or display attributes of the copied components. For example, the additions can indicate which element actions are remotely requested from the source application and which are not.

FIG. 4 further illustrates an example of HTML and JavaScript code that can be copied in order to duplicate portions of the structure of an underlying UI component control in a web application. This is the type of code that can be copied when the application designer copies the components into the new application. In addition, the code for the UI components in the newly created application can be stored in the HTML source code format. User implemented functionality that is different than functionality in the original application can also be added. This user added functionality can include additional component functionality which changes the visibility of an element, etc. Such additions can be saved in the generated HTML. For example, the visual product integrator may change the color or size of a copied element, or may extend the element to contain additional data by adding another column or row to a copied table.

Returning again to FIG. 1, the visual product integrator 102 is configured to copy user interface components and component functionality from an existing application. To copy UI components, the user is prompted to select one or more existing applications 120, 122, 124. The Application Screen Retriever/Analyzer module 110 of the visual integrator 102 can activate the existing applications and display their user interfaces. The retriever module 110 can also connect to the applications' object hierarchy and capture events. In one embodiment, the retriever module 110 can connect to the object hierarchy and capture events of the applications 120, 122, 124 by accessing an object application programming interface (API) associated with the object API's existing applications. Additional information that can be accessed via the object's APIs can include component graphics, data structures, component attributes, and other component information and functionality. For example, the retriever module may access a Document Object Model (DOM) to find an element with a tag title (e.g., x=doc.getElementsbyTagName("title")) and then update the text of that object to some value (e.g., x.nodeValue="New Title"). Alternatively, the retriever module may process certain DOM events for the application, such as when the user clicks on a button (e.g., using the onClick( ) function).

The type of object API used by each of the applications 120, 122, 124 is dependent on the programming language used to create the applications. The visual product integrator 102 can be used to integrate applications written using a variety of different programming languages. For example, the visual product integrator can be used to integrate applications written using at least one of the following environments: HTML, Windows, visual basic, ActiveX, Java, Oracle, Web Services, PowerBuilder, Delphi, Stingray, and .Net. This list is merely provided as an example and is not considered to be exhaustive. The visual product integrator can also be used for applications written with additional types of programming languages that contain a user interface object API. In addition, image recognition can be used to copy user interface objects for user interfaces created with programming languages that do not have an object API, their API is inaccessible, or the programming language includes a proprietary object API. When image recognition techniques are used, the original image of the user interface is decomposed into the appropriate UI components. Once this decomposition is done, the integrator can work as previously described, but with a newly created object model being used instead of the existing DOM.

In one embodiment, one or more of the existing applications 120, 122, 124 may have been created using HTML. The retriever module 110 can connect to the object hierarchy and capture events of the applications 120, 122, 124 using each application's object API. In the case of HTML, the object API is referred to as the document object model (DOM) 115. A user can select the user interface components that he or she desires to copy from the applications 120, 122, 124 into the composite graphical user interface 109 of a new application 108. The visual integrator 102 is configured to duplicate the selected components in the new application. In other words, the HTML code and other web application code is copied into the new application using DOM and/or by accessing the HTML code directly. The copied components are tagged, so that at run time they can be replayed from their original application. In other words, the code of the object is copied and the copied code may be directly executed. If the user decides to execute an action remotely on the source application, the user can change a flag in the new application, and then the new application will execute the script from the replay engine when this action is executed. The user can continue to copy components from any number of applications.

Figure 2:
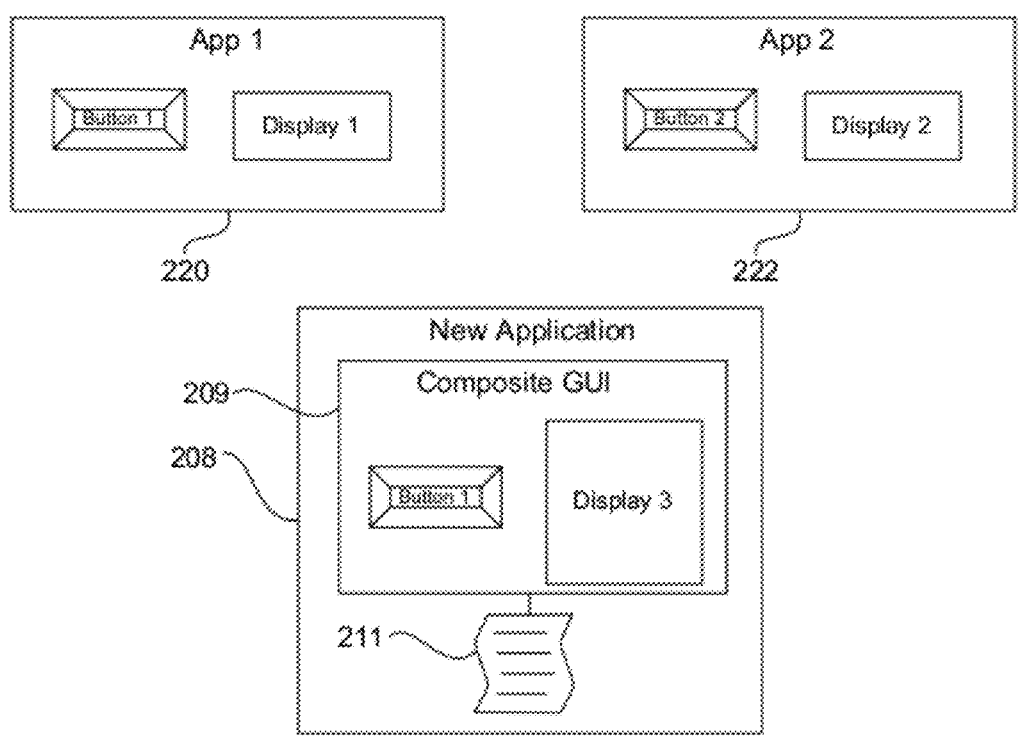
FIG. 2 is an illustration of an example of objects in multiple existing applications being copied to a composite graphical user interface in accordance with an embodiment

For example, FIG. 2 provides an illustration of a first application 220 and a second application 222. A company may desire to have a single application that displays and manipulates information from both the first application and the second applications. An application designer can use the visual product integrator to create a new application 208 that includes a composite graphical user interface 209. The composite GUI 209 can be designed to include functionality from the first 220 and second 222 applications.

In this example, the application designer can create a composite graphical user interface containing the desired components. For example, the application designer may copy (i.e. select and drag) a component, such as Button 1, from the first application to the composite user interface 209 of the new application 208. Similarly, Display 1 from the first can be copied to the composite user interface of the new application as Display 3. While the user only has to select and drag the desired components from the existing application into the new application, the underlying tool copies the components as described above. In one embodiment, the programmer can connect the appropriate scripts to the newly created user interface component. Alternatively, the scripts can be automatically linked to the user interface component by graphically associating a tag set in the copied object with a tag set in the scripts for the same the copied object.

In one embodiment, the functionality of the objects copied from the plurality of applications 220, 222 into the composite GUI 209 of a new application 208 can have the same functionality as the object originally had in the existing application. The application designer, using the visual integrator, can select the "keep original behavior" mode for each copied object. Thus, Button 1, can continue to operate and display the same information in Display 3 of the new application 208 as the objects did in the first 220 application. The functionality of the objects can be automatically obtained from the object API, such as the document object model of the first and second applications. When an object is copied to the new application, the event handlers or capture events can be copied to the new component as stubs, and these stubs can be linked to scripts. The information in the document object model for each object can be copied to the new application to enable the objects to have the same function. The visual integrator can enable either or both of the first 220 and second 222 applications to be executed in the background. When a user selects Button 1 in the new application 208, Button 1 in the first application 220 can be actuated in the associated existing application running in the background using the script associated with Button 1 in the new application. The resulting information in Display 3 can then be copied from the first application 220 using the application screen retriever/analyzer module 110 (FIG. 1) running in the background. The information can be displayed in Display 3 in the composite GUI 209 of the new application 208.

The information displayed in the components of the composite GUI can be obtained from the existing applications using a protocol for remote browsing. Every existing web application contains a software agent in the web application to send its current DOM status to the visual integrator. The composite GUI can connect to the composite GUI through the applications event dispatcher and can obtain the desired display information from copied controls in the existing applications.

Alternatively, objects that have been copied from an existing application to a composite user interface 209 can be assigned a function in the new application 208 that is different from the object's original function. For example, Button 1 may have updated the display in Display 1 in the original application 220. However, in the composite GUI 209 in the new application 208, Button 1 can be configured to update the display of both Display 1 and Display 2. The information in Display 1 and Display 2 can be combined and shown in Display 3 of the new application.

Functions that are assigned to user interface objects in the composite user interface 209 of the new application 208 can be configured as scripts or macros 211. Each macro can be a composite of a plurality of recorded functions. At design time, macros can be recorded from the existing applications using a software record engine 111 (FIG. 1). Example software record engines include Quick Test Professional (QTP) and Selenium. The software record engine can be an external software application, or a software application that has been integrated with the visual integrator 102. It is also possible to import macros that were recorded or manually written elsewhere.

For example, the application designer can use a software application record engine 111 (FIG. 1) to record a user's interactions with each of the plurality of software applications 220, 222. After activating the record engine, the user can use the existing applications as he or she typically would to achieve a desired action or result. For instance, the user may typically select Button 1 to update the display in Display 1, and select Button 2 to update the display in Display 2 236. The record engine can record these actions as macros 211, thereby recording the functions of the objects in the existing software applications. These macros can then be applied to the objects, such as Button 1 and Display 3, in the composite user interface 208 to assign the functions of the existing software applications to the objects in the composite user interface.

The recorded macros 211 can be amended to alter the functions recorded in the existing applications 220, 222. For instance, the recorded macros in the example above will show that Button 1 updates Display 1 and Button 2 updates Display 2 236. These macros can be amended to allow both Display 1 and Display 2 in the composite user interface 208 to appear in Display 3. Data that is collected from the underlying applications can be displayed separately or in a composite fashion in the new application (composite GUI). Alternatively, additional processing can take place in the new application to transform the data received from the underlying applications. A macro can be applied to Button 1 in the Composite GUI 209 that will actuate Button 1 in App 1 and Button 2 in App 2, thereby updating the values of Display 1 and Display 2, which can be shown together in Display 3.

In certain types of software applications, the object API may not exist, may contain only a portion of the desired information, or may not be accessible. For example, in Web 2.0 applications, software as a service (SAAS) applications, and in applications run through virtualization, the object API may not be accessible. The same can be true of remote desktop software which relies on protocols such as Remote Desktop Protocol (RDP), Independent Computing Architecture (ICA), or Remote Frame Buffer. These remote desktop applications typically work off of image transfer where there is no access to the object UI API.

When no object API exists, the object API does not contain all of the desired information, or the object API is not supported by the visual integrator, then components contained in the existing software applications 220, 222 can be effectively copied to the composite GUI 209 in the new application 208 using image recognition software. Instead of relying on the existing software's object API to determine what a selected component is, and how it interacts with other components in the existing application, it is possible to use image recognition to determine what the component is. Image recognition software can be used to infer some properties of a selected object in an image and to recreate the object hierarchy. The properties obtained of the selected object from the image can be used to duplicate the object's appearance and behavior in the composite GUI 209. In addition, the user's interaction with the existing software can be recorded, as previously discussed. The user's interaction with the components can provide additional information that enables the image recognition software to determine the component's interaction with other components in the existing software application. This information can then be transferred to a selected component that has been inserted in the composite GUI 209 in the new application 208. Using object recognition to effectively copy GUI objects is further disclosed in copending U.S. patent application GRAPHICAL USER INTERFACE COMPONENT CLASSIFICATION, Ser. No. 12/605,418, filed Oct. 26, 2009 assigned HP Patent Application No. 200903215, which is hereby incorporated by reference.

Returning to FIG. 1, once the composite user interface 109 for the new application 108 has been created, the visual integrator's 102 runtime engine 106 can be used to run the new application 108. At run time, the visual integrator 102 can (1) run the new application 108; (2) refresh copied user interface objects from the original software application; and (3) run macros 119 assigned to objects in the composite user interface on the existing software applications.

In one embodiment, the runtime engine 106 can be a specialized browser configured to process HTML and JavaScripts. This specialized engine is configured to make the calls to the underlying applications and the record/replay engine 111. Further, the runtime engine is configured to interpret and process the extra XML data provided for each copied or upgraded component.

As previously discussed, at runtime for the new application, the existing applications 120, 122, 124 can be executed by the visual integrator in a virtual machine 130. The existing applications that are executed in the virtual machine are those that contribute functionality to the composite GUI 109 in the new application 108.

The application event dispatcher 112 can be used to handle the events 113 of the new application 108 that refer to any of the objects in the original software applications 120, 122, 124. The application event dispatcher dispatches events 113 that occur in the composite GUI 109 to the original software application associated with the object.

In addition, the application event dispatcher refreshes the state of copied user interface objects in the composite GUI 109 based on the state of the respective objects of the original software application 120, 122, 124. If the objects have been updated in the original application, then they are updated in the new application. This ensures that changes in the data and graphics displayed in the composite GUI are updated with changes that occur in the original software applications. The application event dispatcher 112 also handles macros 119 that were recorded using the software record engine 111.

In one embodiment, the new application 108 can be written using the same language in which the existing applications are written. For example, if the existing applications are written in Java, the new application can be created by the visual integrator 102 using Java. Alternatively, the new application can be constructed using a different language from that used to create the existing software applications 120, 122, 124. It is possible that the existing software applications may contain components of multiple different software languages, such as Java, HTML, and .NET. The new application 108 may be written using a single language, such as HTML, or multiple languages where necessary, such as HTML and Java. For example, a first existing application may be written in Java. A second existing application may be written using the .Net architecture. The new application having a composite GUI can be written in HTML.

In one embodiment, the visual integrator can be configured to enable a user to select which type of language is used to construct the composite graphical user interface 109 and the associated objects therein. In order to accommodate multiple languages, the application screen retriever/analyzer module 110 can be configured to recognize when a selected user interface object from an existing application has been created using a particular language. For example, an existing application 120 may be written using HTML and Java. The application designer may wish to copy a selected object from the existing application. The screen retriever/analyzer module can recognize whether the selected object was created using HTML or Java. The screen retriever/analyzer module can then inform the application design module 104 to create the object in the composite GUI 109 of the new application 108. In one embodiment, the object can be created in the composite GUI of the new application using the same language it was written in. Alternatively, the object may be created using a different language. For instance, the composite GUI may be created using only HTML. So any Java objects that are selected in the existing application 120 can be implemented as HTML objects in the composite GUI 109 of the new application 108. The new HTML object can act as a "proxy" to the application functionality of the existing Java object.

In another embodiment, the application designer can select the language in which each copied object is created in the composite GUI. For example, the application designer may select an object in the existing application 120 that was created using Java. The designer can select that the object is created in the composite GUI 109 of the new application 108 using HTML. If there are language limitations, such as functions of the selected object that cannot be directly converted from Java to HTML, the application screen retriever/analyzer module 110 can inform the user that some functionality may be lost unless the object is created using the original language.

Figure 5:
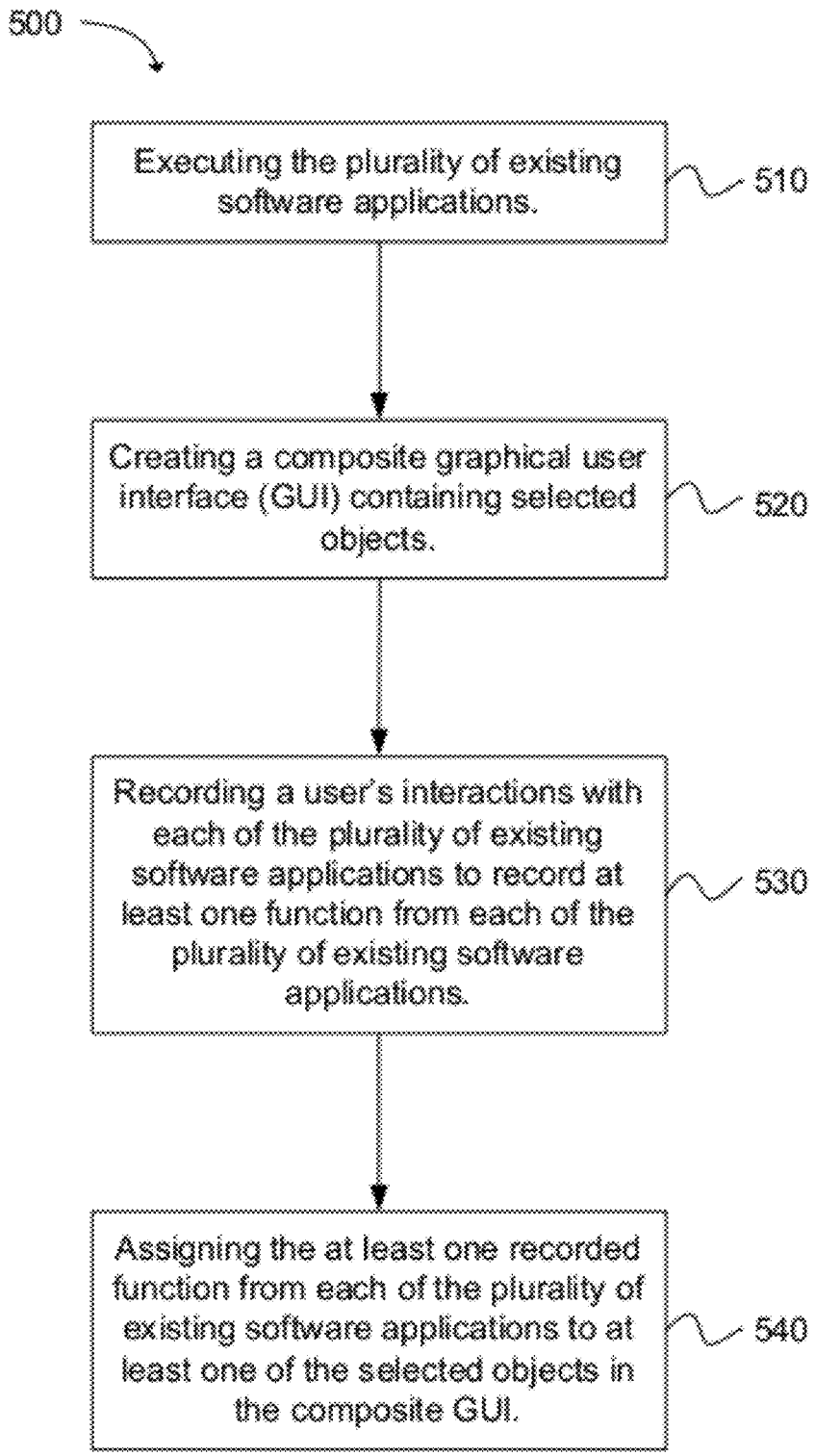
FIG. 5 is a flow chart depicting a method for integrating a plurality of existing software applications in accordance with an embodiment.

In one embodiment, a method 500 for integrating a plurality of existing software applications is disclosed, as depicted in the flowchart of FIG. 5. The method includes the operation of executing 510 the plurality of existing software applications. A composite graphical user interface (GUI) is created 520 that contains selected objects. The objects can be active objects, such as buttons, tabs, drop down boxes, lists, and so forth. The objects can also be passive objects, such as text displays and graphical displays. A user's interactions with each of the plurality of existing software applications can be recorded 530 to capture at least one function from each of the plurality of existing software applications such that the at least one recorded function is played back when the at least one selected object is activated in the composite GUI. The functions can be recorded as macros 119. A macro can include a single function from a single existing application, or multiple functions from multiple existing applications. The at least one recorded function from each of the plurality of existing software applications can be assigned 540 to at least one of the selected objects in the composite GUI. The macro can be played back when the at least one selected object is activated in the composite GUI. This enables the objects in the composite GUI to have the functions selected in the plurality of original software applications.

The ability to quickly create a composite GUI containing functionality from multiple existing applications can enable businesses to operate more efficiently. In addition, significant cost and efficiency savings can be achieved when new businesses are created through mergers and acquisitions. The disparate software applications used to run separate businesses prior to the merger or acquisition can be quickly integrated. Since the creation of the composite GUI can be accomplished using the visual product integrator in a relatively short period of time, the layout and functionality of the composite GUI can be updated and changed until the user of the composite GUI is satisfied with its performance, thereby significantly enhancing the efficiency and performance of companies using custom software applications.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for integrating a plurality of existing software applications, comprising:
    executing the plurality of existing software applications;
    creating a composite graphical user interface (GUI) containing selected objects;
    recording a user's interactions with each of the plurality of existing software applications to capture at least one function from each of the plurality of existing software applications; and
    assigning the at least one recorded function from each of the plurality of existing software applications to at least one of the selected objects in the composite GUI such that the at least one recorded function is played back when the at least one selected object is activated in the composite GUI.

2. The method of claim 1, wherein creating the composite GUI containing the selected objects further comprises copying at least one of the selected objects from the plurality of existing software applications to the composite GUI.

3. The method of claim 2, further comprising copying at least one of the selected objects from the plurality of existing software applications to the composite GUI, wherein the at least one copied object maintains a same function in the composite user interface as in the existing software application from which the at least one object was copied.

4. The method of claim 2, further comprising copying at least one of the selected objects from the plurality of existing software applications to the composite user interface, wherein the copied object is assigned a new function in the composite GUI different from a function performed in the existing software application from which the object was copied.

5. The method of claim 1, wherein recording the user's interactions further comprises recording a flow of data in the plurality of existing software applications as the user interacts with each of the plurality of existing software applications.

6. The method of claim 5, further comprising assigning the at least one recorded function to the at least one selected object such that the flow of data in the plurality of existing software applications is maintained in the composite GUI.

7. The method of claim 1, wherein recording a user's interactions with each of the plurality of existing software applications to record at least one function from each of the plurality of existing software applications further comprises determining the at least one function of each of the existing software applications using the existing application's user interface object API.

8. The method of claim 1, wherein recording a user's interactions with each of the plurality of existing software applications to record at least one function further comprises recording a macro associated with the user's interactions with at least one of the existing software applications and amending the macro in a desired way to alter the function to be assigned to the at least one of the selected objects in the composite GUI.

9. The method of claim 1, wherein assigning the at least one recorded function further comprises assigning a plurality of recorded functions from the plurality of existing software applications to a single selected object in the composite GUI.

10. The method of claim 1, further comprising executing the plurality of existing software applications in a background after the composite GUI has been created such that only the composite GUI is visible.

11. The method of claim 10, further comprising retrieving information from the existing application while the plurality of existing software applications are executing in the background and applying the retrieved information to the at least one selected object in the composite GUI to enable the at least one recorded function from each of the plurality of software applications to operate in the composite GUI.

12. The method of claim 1, wherein recording a user's interactions with each of the plurality of existing software applications further comprises recording a macro of the user's interactions with each of the plurality of existing software applications.

13. The method of claim 12, further comprising assigning the macro to at least one of the selected objects in the composite GUI.

14. The method of claim 12, further comprising assigning at least one object in the composite GUI to at least one recorded macro of the user's interactions with each of the plurality of existing software applications.

15. A system for integrating a plurality of existing software applications, comprising:
one or more processors;
one or more non-transitory computer readable media;
computer readable instructions on the one or more computer readable media which, when executed by the one or more processors, cause the one or more processors to implement a method for integrating the plurality of existing software applications, comprising:
a visual product integrator module comprising:
an application design module configured to create a composite graphical user interface (GUI) containing selected objects operable to execute in a new application;
an application screen retriever/analyzer module configured to record a user's interactions with the plurality of existing software applications as at least one macro and to assign the at least one macro to at least one of the selected objects in the composite GUI; and
a runtime engine operable to execute the plurality of existing software applications and to execute the new application containing the composite GUI to enable at least one function from each of the plurality of existing software applications to be controlled using the composite GUI by running the at least one macro.

16. The system of claim 15, further comprising an applications event dispatcher configured to dispatch events from the at least one selected object in the composite GUI to the plurality of existing software applications to enable the composite GUI to control at least one function in each of the plurality of existing software applications.

17. The system of claim 15, wherein the runtime engine is configured to operate a virtual machine configured to allow the plurality of existing software applications to execute in a background and to execute the new application containing the composite GUI in a foreground to enable at least one function from each of the plurality of existing software applications to be controlled using the composite GUI.

18. A system comprising:
one or more processors;
one or more non-transitory computer readable media;
computer readable instructions on the one or more computer readable media which, when executed by the one or more processors, cause the one or more processors to implement a method for integrating a plurality of existing software applications, comprising:
executing the plurality of existing software applications;
creating a composite graphical user interface (GUI) containing at least one object;
recording a user's interactions with each of the plurality of existing software applications to record at least one function from the plurality of existing software applications; and
assigning the at least one recorded function from the plurality of existing software applications to the at least one object in the composite GUI.

19. The system of claim 18, wherein creating the composite GUI containing at least one object objects further comprises copying the at least one object from at least one of the plurality of exiting software applications to the composite GUI.

20. The system of claim 18, wherein recording a user's interactions with each of the plurality of existing software applications further comprises recording at least one macro of the user's interactions with each of the plurality of existing software applications and assigning the at least one macro to the at least one object in the composite GUI.

* * * * *

UNITED STATES PATENT AND TRADEMARK OFFICE
CERTIFICATE OF CORRECTION

| | | |
|---|---|---|
| PATENT NO. | : 8,352,875 B2 | Page 1 of 1 |
| APPLICATION NO. | : 12/620520 | |
| DATED | : January 8, 2013 | |
| INVENTOR(S) | : Christopher Peltz et al. | |

It is certified that error appears in the above-identified patent and that said Letters Patent is hereby corrected as shown below:

On the title page, item (75), Inventors, in column 1, line 4, delete "Bantolini," and insert -- Bartolini, --, therefor.

In the Claims:

In column 12, line 36, in Claim 19, before "further" delete "objects".

Signed and Sealed this
Fourteenth Day of May, 2013

Teresa Stanek Rea
*Acting Director of the United States Patent and Trademark Office*